(12) United States Patent
Jones et al.

(10) Patent No.: US 11,769,128 B2
(45) Date of Patent: Sep. 26, 2023

(54) MULTI-PROTOCOL DATA TRANSFER

(71) Applicant: VISA INTERNATIONAL SERVICE ASSOCIATION, San Francisco, CA (US)

(72) Inventors: Christopher Jones, San Francisco, CA (US); Sanjeev Sharma, Foster City, CA (US); Christian Flurscheim, Foster City, CA (US); Chandra Srivastava, San Francisco, CA (US); Vishwanath Shastry, San Francisco, CA (US); Kiushan Pirzadeh, Foster City, CA (US); Christian Aabye, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 17 days.

(21) Appl. No.: 17/480,753

(22) Filed: Sep. 21, 2021

(65) Prior Publication Data
US 2022/0005013 A1    Jan. 6, 2022

Related U.S. Application Data

(63) Continuation of application No. 15/563,397, filed as application No. PCT/US2016/025360 on Mar. 31, 2016, now Pat. No. 11,151,533.
(Continued)

(51) Int. Cl.
*G06Q 20/20* (2012.01)
*G06Q 20/32* (2012.01)
(Continued)

(52) U.S. Cl.
CPC ......... *G06Q 20/202* (2013.01); *G06Q 20/20* (2013.01); *G06Q 20/204* (2013.01);
(Continued)

(58) Field of Classification Search
CPC .................................................... G06Q 20/202
See application file for complete search history.

(56) References Cited

U.S. PATENT DOCUMENTS

| 6,609,206 B1 | 8/2003 | Veneklase |
|---|---|---|
| 8,812,782 B2 | 8/2014 | Li |

(Continued)

FOREIGN PATENT DOCUMENTS

| CN | 101673247 A | 3/2010 |
|---|---|---|
| CN | 105590200 A | 5/2016 |

(Continued)

OTHER PUBLICATIONS

Sarath Pillai, "What is TCP MULTIPATH and how does MULTIPATH in TCP work", Oct. 28, 2013, available at https://www.slashroot.in/what-tcp-multipath-and-how-does-multipath-tcp-work (Year: 2013).*
(Continued)

*Primary Examiner* — Allen C Chein
(74) *Attorney, Agent, or Firm* — K&L Gates LLP

(57) ABSTRACT

A computer-implemented method of communicating with a point of sale terminal. The method includes establishing wireless communication with a point of sale terminal using a first communication channel, and establishing communication with the point of sale terminal using a second communication channel. The method also includes transmitting a first section of communication data via the first communication channel; and transmitting a second section of the communication data using the second communication channel.

12 Claims, 7 Drawing Sheets

Related U.S. Application Data

(60) Provisional application No. 62/140,921, filed on Mar. 31, 2015.

(51) Int. Cl.
  *H04W 4/80* (2018.01)
  *H04W 84/12* (2009.01)

(52) U.S. Cl.
  CPC ......... *G06Q 20/209* (2013.01); *G06Q 20/327* (2013.01); *H04W 4/80* (2018.02); *H04W 84/12* (2013.01)

(56) References Cited

U.S. PATENT DOCUMENTS

| | | | |
|---|---|---|---|
| 8,856,045 B1 | 10/2014 | Patel | |
| 11,151,533 B2 | 10/2021 | Jones | |
| 2005/0101295 A1* | 5/2005 | Rupp | G06Q 30/04 455/410 |
| 2008/0159201 A1 | 7/2008 | Ozluturk | |
| 2008/0320476 A1 | 12/2008 | Wingard | |
| 2009/0235074 A1* | 9/2009 | Salgarelli | G06Q 20/20 713/168 |
| 2011/0016051 A1* | 1/2011 | Trifiletti | G06Q 20/401 707/769 |
| 2013/0110657 A1 | 5/2013 | Forster | |
| 2014/0008434 A1 | 1/2014 | De Geer | |
| 2014/0172700 A1 | 6/2014 | Teuwen | |
| 2014/0207591 A1* | 7/2014 | Acker, Jr. | G06Q 30/0633 705/26.8 |
| 2014/0279479 A1* | 9/2014 | Maniar | G06Q 20/36 705/41 |
| 2015/0025988 A1 | 1/2015 | Fisher | |
| 2015/0081440 A1 | 3/2015 | Blemaster | |

FOREIGN PATENT DOCUMENTS

| | | | |
|---|---|---|---|
| CN | 105590200 A | * | 8/2017 |
| WO | 2015040543 A1 | | 3/2015 |

OTHER PUBLICATIONS

Chinese Office Action (with English language translation) for Application No. CN201680020139.X, dated Aug. 7, 2020, 25 pages.

Chinese Office Action (with English language translation) for Application No. CN201680020139.X, dated Jan. 17, 2020, 15 pages.

European Patent Office Communication pursuant to Article 94(3) EPC for App. No. EP16774243.6, dated Sep. 25, 2020, 7 pages.

International Search Report and Written Opinion For International Application No. PCT/US2016/025360 Filed Mar. 31, 2016 (pp. 1-16).

Notice of Allowance dated Aug. 10, 2021 for U.S. Appl. No. 15/563,397 (pp. 1-9).

Office Action dated Jan. 12, 2021 for U.S. Appl. No. 15/563,397 (pp. 1-13).

Office Action dated Mar. 18, 2020 for U.S. Appl. No. 15/563,397 (pp. 1-19).

Office Action dated Nov. 19, 2020 for U.S. Appl. No. 15/563,397 (pp. 1-12).

Office Action dated Sep. 30, 2019 for U.S. Appl. No. 15/563,397 (pp. 1-17).

Pillai, "What is TCP MULTIPATH and how does MULTIPATH in TCP work", 2013, available at https://www.slashroot.in/ what-tcp-multipath-and-how-does-nnultipath-work (Year: 2013).

\* cited by examiner

102

104

Identification Msg
202

Ready to Pay Msg
204

Data Exchange
206

Confirm Amt. Msg.
208

Credential Msg.
210

Summary Msg
212

FIG. 2

| ID Msg 202 | Merchandise selection entered into system | Ready to Pay 204 | Data exchange 206 | Confirm amount 208 | Payment Credential 210 | Summary Msg 212 |
|---|---|---|---|---|---|---|
| NFC | | BLE | BLE | BLE | BLE | BLE |

FIG. 3

| ID Msg 202 | Merchandise selection entered into system | Ready to Pay 204 | Data exchange 206 | Confirm amount 208 | Payment Credential 210 | Summary Msg 212 |
|---|---|---|---|---|---|---|
| NFC | | NFC | BLE | BLE | BLE | BLE |

FIG. 4

| ID Msg 202 | Merchandise selection entered into system | Ready to Pay 204 | Data exchange 206 | Confirm amount 208 | Payment Credential 210 | Summary Msg 212 |
|---|---|---|---|---|---|---|
| NFC | | NFC | NFC | BLE | BLE | BLE |
| NFC | | NFC | NFC | BLE | NFC | BLE |
| NFC | | NFC | NFC | NFC | NFC | BLE |

FIG. 5

| ID Msg 202 | Merchandise selection entered into system | Ready to Pay 204 | Data exchange 206 | Confirm amount 208 | Payment Credential 210 | Summary Msg 212 |
|---|---|---|---|---|---|---|
| BLE | | NFC | BLE | NFC | NFC | BLE |

FIG. 6

MULTI-PROTOCOL DATA TRANSFER

CROSS-REFERENCE TO RELATED APPLICATIONS

This application is a Continuation of U.S. application Ser. No. 15/563,397, filed on Sep. 29, 2017, which is a National Stage Entry under 35 U.S.C. § 371 of International Patent Application PCT/US2016/025360, filed Mar. 31, 2016, which claims priority to and the benefit of U.S. Provisional Application No. 62/140,921, filed Mar. 31, 2015, the entirety of which is incorporated by reference herein.

BACKGROUND

Merchants continually seek easier and safer ways to accept payment for goods and services. Smart phones continue to proliferate and are increasingly being used to make purchases. Wireless communications, however, may be subject to security risks and/or may have an unacceptably slow data transfer rate. Improved ways to wirelessly make payments is needed.

SUMMARY

In one embodiment, the disclosure describes a computer-implemented method of communicating with a point of sale terminal. The method includes establishing wireless communication with a point of sale terminal using a first communication channel, and establishing communication with the point of sale terminal using a second communication channel. The method also includes transmitting a first section of communication data via the first communication channel; and transmitting a second section of the communication data using the second communication channel.

In another embodiment, the disclosure describes a computer-implemented method of communicating with a point of sale terminal. The method includes establishing wireless communication with a point of sale terminal using a first communication channel, and establishing wireless communication with the point of sale terminal using a second communication channel. The method also includes transmitting a first type of communication data to the point of sale terminal via the first communication channel, and transmitting a second type of communication data to the point of sale terminal via the second communication channel.

In yet another embodiment, the disclosure describes a computer-implemented method of communicating with a point of sale terminal. The method includes establishing wireless communication with a point of sale terminal using a first communication channel and establishing wireless communication with a point of sale terminal using a second communication channel. The method includes transmitting a first type of communication data to the point of sale terminal via the first communication channel and transmitting a second type of communication data to the point of sale terminal via the second communication channel. The method also includes receiving a third type of communication data from the point of sale terminal via at least one of the first communication channel or the second communication channel, where the first communication channel is one of near field communication or Bluetooth light energy, and wherein the second communication channel is the other one of near field communication or Bluetooth light energy.

BRIEF DESCRIPTION OF THE DRAWINGS

The invention may be better understood by references to the detailed description when considered in connection with the accompanying drawings. The components in the figures are not necessarily to scale, emphasis instead being placed upon illustrating the principles of the invention. In the figures, like reference numerals designate corresponding parts throughout the different views.

FIG. 2 illustrates communication flow between a user device and a point of sale terminal in accordance with example embodiments;

FIGS. 3-6 illustrate different communication channels that may be used to transmit messages between a user device and a point of sale terminal in accordance with example embodiments;

Figure 1:
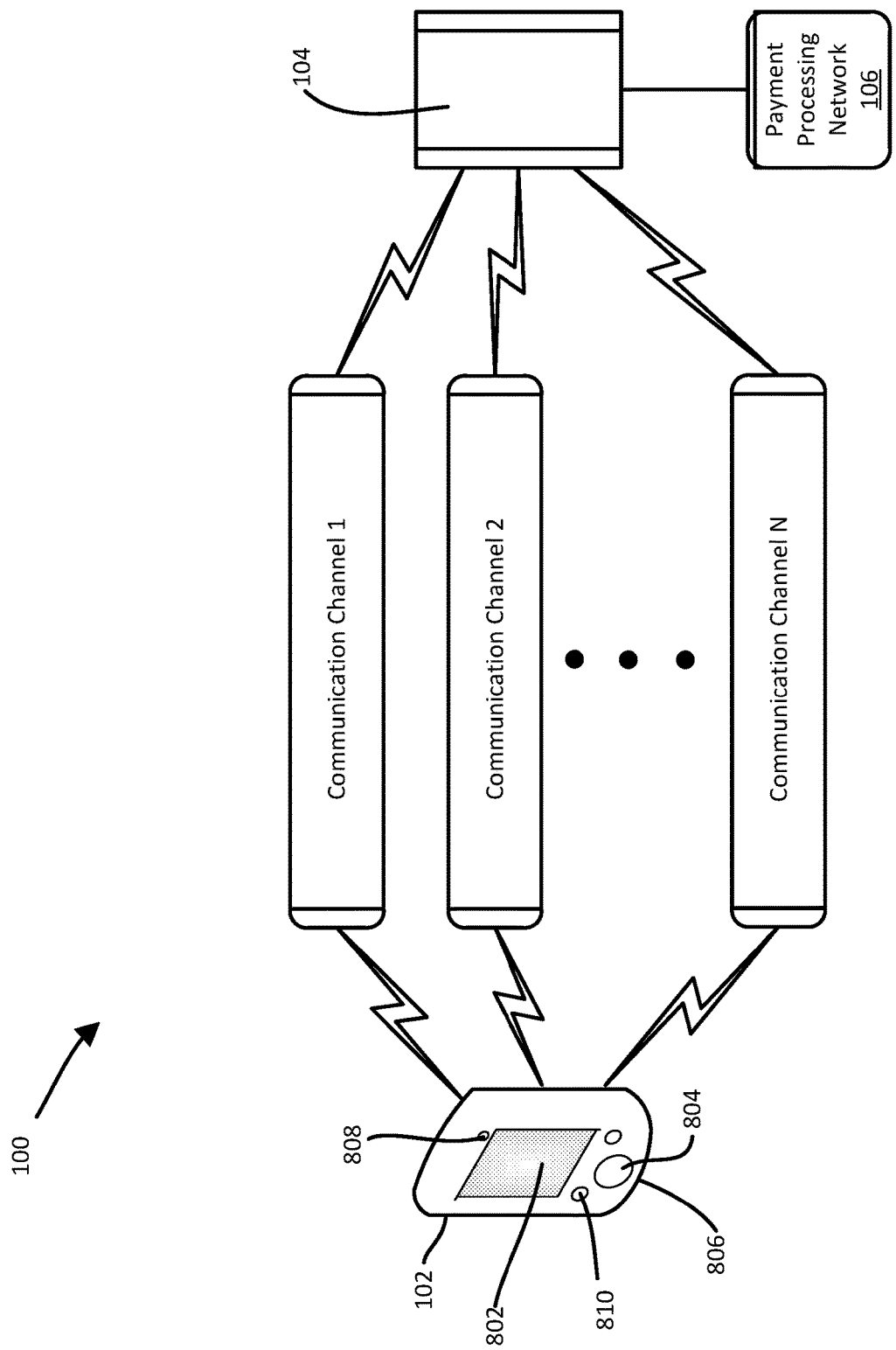
FIG. 1 illustrates an embodiment of system for multi-protocol data transfer in accordance with the disclosure.

Persons of ordinary skill in the art will appreciate that elements in the figures are illustrated for simplicity and clarity so not all connections and options have been shown to avoid obscuring the inventive aspects. For example, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meanings have otherwise been set forth herein.

Specification

The present disclosure now will be described more fully with reference to the accompanying drawings, which form a part hereof, and which show, by way of illustration, specific exemplary embodiments by which the invention may be practiced. These illustrations and exemplary embodiments are presented with the understanding that the present disclosure is an exemplification of the principles of one or more inventions and is not intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods, systems, computer readable media, apparatuses, or devices. Accordingly, the example embodiments may take the form of an entirely hardware embodiment, an entirely software embodiment, or an embodiment combining software and hardware aspects. The following detailed description is, therefore, not to be taken in a limiting sense.

The example embodiments may overcome problems that occur when using a single wireless/contactless protocol to make a purchase via a point of sale terminal. Near field communication (NFC) has certain limitations and cannot be conveniently used to add information beyond a relatively small standard data set. Adding additional data or fields (e.g. loyalty information) beyond payment information adds delay when using NFC to make a payment and requires the user to hold his/her phone up to a POS reader for an extended period of time. The example embodiments overcome these and other issues through use of multiple communication channels.

The example embodiments describe a system, method, apparatus, and computer readable media that may be configured to enable a point of sale terminal to wirelessly communicate with a user device over two or more communication channels. Each channel may carry a different message thereby resulting in increased speed and/or data security. The example embodiments discuss sending some data over a near field communication (NFC) channel and other data over a Bluetooth low energy (BLE) channel. Other logical and physical communication channels may be used instead of, or in addition to, an NFC channel and a BLE channel.

FIG. 1 illustrates a system 100 in accordance with example embodiments. The system 100 may include a user device 102 that may wirelessly communicate with a point of sale (POS) terminal 104 via one or more communication channels 1, 2, . . . N, where N represents an integer larger than 2. User device 102 may be a smart phone, a lap top, or other device capable of communicating data wirelessly. The user device 102 may also have a display 802 which may or may not be a touch sensitive display. More specifically, the display 82 may have a capacitance sensor, for example, that may be used to provide input data to the user device 102. In other embodiments, an input pad 804 such as arrows, scroll wheels, keyboards, etc., may be used to provide inputs to the user device 102. In addition, the user device 102 may have a microphone 806 which may accept and store verbal data, a camera 808 to accept images and a speaker 810 to communicate sounds. The user device 102 may store a software payment application (e.g., a payment app) that was downloaded at some previous point in time or otherwise installed onto the user device. The payment app may be associated with one or more payment credentials used to make purchases. In an example, a payment credential may be associated with and used to identify a credit or debit account. The POS terminal 104 may be a device that can accept and process a payment credential during a purchase transaction. The POS terminal 104 may be coupled to a payment processing network 106 that communicates with an issuing bank and an acquiring bank to approve or decline a requested payment transaction. Example payment transactions may include requesting payment using a debit account, a credit account, or other account. Details of the payment processing network 106 are well-known and not further described herein. When a user enters into a store, the user device 102 may communicate with the POS terminal 104 as described below.

FIG. 2 illustrates communication flow between user device 102 and POS terminal 104 in accordance with example embodiments. A user may enter a store carrying his or her user device 102. The user device 102 or the POS terminal 104 may detect the presence of the other over one or more of a variety of wireless communications protocols. For example, the user device 102 may detect the POS terminal 104 and send an identification (ID) message 202 to the POS terminal 104. In other examples, the POS terminal 104 may detect the user device 102 and invite the user device 102 to send the ID message 202. In yet other examples, the store may display advertising prompting the user to place user device 102 at a particular location within the store (e.g., tap on a POS terminal, NFC reader, NFC tag, etc.) to cause the user device 102 to send the ID message 202. The ID message 202 may include a unique identifier for the user device 102 and what communication channels the device 102 is configured to use. In some examples, the POS terminal 104 may use the unique identifier to access a user profile for marketing to the user.

After sending ID message 202, the user device 102 and the POS terminal 104 may communicate with one another to establish communication parameters for each of one or more communication channels to be used. For example, the communication parameters may indicate what communication channels are supported by the user device 102 (e.g., BLE, NFC, etc.). Establishing of the communication parameters may be called "pairing" under Bluetooth standards and binding under NFC standards. The ID message 202 and establishment of the communication parameters may occur without requiring the user to make any selections or provide any input.

At some later time, the user may select one or more items (e.g., products and/or services) to buy. For example, a user may pick one or more physical objects to purchase and bring them to a register in the store. The user may launch the payment application, which may cause the user device 102 to communicate a ready to pay message 204 to the POS terminal 104. In some embodiments, the payment application may accessible from a payment issuer website via an internet browser on the user device 102. Subsequent to receipt, the POS terminal 104 and the user device 102 may exchange data 206 regarding the items to be purchased such as a purchase item identifier, and the total amount of the purchase price. For example, the user device 102 may present a graphical user interface and the user may place one or more items to purchase in a virtual shopping cart. The user device 102 may communicate the contents of the virtual shopping cart to the POS terminal 104. In another example, the user may bring items to purchase to a physical cash register, and the POS terminal 104 may communicate information about the items and their cost to the user device 102. In yet another example embodiment, the user device 102 may scan a bar code on the items for purchase via the camera 108 or other visual sensory technology, or may communicate with other active or passive wireless information carriers associated with the items, such as radio frequency identification (RFID) tags. In such embodiments, the user device 102 can then communicated the scanned items to the POS terminal 104.

The user device 102 may then display the cost of each item and the total and prompt the user for approval to pay. If the user provides input indicating that the total cost is acceptable, the user device 102 may communicate a confirmation message 208 to the POS terminal 104 confirming that the total cost is acceptable and that the POS terminal 104 is permitted to charge that amount to the user's account. The user device 102 may also communicate a payment credential message 210 including a payment credential associated with a payment account to be used to make payment. The POS terminal 104 may communicate a payment transaction message that includes the payment credential and the total cost to the payment processing network 106. The POS terminal 104 may receive a reply from the payment processing network 106 indicating whether the total cost is approved for payment. Whether or not approved, the POS terminal 104 may communicate a summary message 212 to the user device 102. The summary message 212 may indicate whether the transaction was approved or not.

If approved, the summary message 212 may include a sales receipt listing the purchased items.

In an example the user device 102 and the POS terminal 104 may utilize two or more communications channels when sending messages 202-212. FIGS. 3-6 illustrates tables listing what communication channels may be used to send the different messages in accordance with example embodiments. The following discussion describes each Figure and the benefits associated therewith.

There may be several advantages to using more than one communication channel in a transaction. In one embodiment, the first channel may follow a very rigid protocol related to processing a transaction. There is very limited opportunity to add additional data to the protocol which may limit what a merchant may be able to offer to a customer. By using a second channel that is not following the rigid protocol, additional data may be communicated to the customer. The additional data may take on a variety of forms such as an advertisement, a coupon, a discount code, an enticement to use a related merchant, a sound that may be unique to the merchant, a video, etc.

In addition, the second channel may provide a security purpose. By having the sensitive data split or disbursed over multiple communication channels, a hacker would have to hack into both the first and second channels to obtain data that may be useful to the hacker. Further, by alternating the channels, it may be even more difficult for a hacker to intercept a complete message. In addition, specific bits may be sent on different channels which again may make it especially difficult for a hacker to intercept any useful signals.

Moreover, the second channel or other additional channels may provide an increase in data flow. Similar to filing a swimming pool with one hose or two, more data may be communicated to a customer using two channels than one channel. The increase in data rates may provide a variety of opportunities for merchant to increase communication to consumers and to provide a more enriching experience. As an example, a graphical user interface to create a transaction may be vastly superior if additional data may be communicated to create the graphical user interface and the second channel is reserved to process the transaction.

FIG. 3 illustrates a table providing a channel configuration in accordance with example embodiments. The table lists an embodiment in which NFC and BLE communication channels are utilized to advantageously put the user in control of the payment experience conducted through the payment application.

Initially, a user may check-in by touching user device 102 to a POS terminal 104 upon entry to a merchant's store. In this example, the POS terminal 104 may include an NFC reader or NFC tag. The POS terminal 104 may also include one or more NFC readers or NFC tags positioned around a store. During check-in, the POS terminal 104 may communicate with the user device 102 to bind with the device 102. For example, the user device 102 may use an NFC channel to communicate the ID message 202 to the POS terminal 104. After binding, the user device 102 and the POS terminal 104 may use a BLE channel for subsequent communications. For example, a user may launch a payment app when ready to pay and the payment app may cause device 102 to send a ready to pay message 204 via a BLE channel. The user device 102 and POS terminal 104 may exchange data 206, such as Value Added Service (VAS) data such as an offer or coupon via a BLE channel.

The user device 102 may also communicate a payment confirmation amount message 208 and a payment credential message 210 to the POS terminal 104 via a BLE channel. The POS terminal 104 may then form a payment transaction message including the payment credential and the total amount and communicate the payment transaction message to the payment processing network 106 seeking approval. Whether approved or declined, the POS terminal 104 may communicate the summary message 212 including, for example, an indication whether the payment transaction was approved and a copy of the user's receipt identifying what items were purchased via a BLE channel.

FIG. 4 illustrates a table providing another channel configuration in accordance with example embodiments. An advantage of operating communication channels in this manner is that it leverages existing POS hardware setup and involves familiar consumer behavior (e.g., a tap on the POS terminal 104 initiates a payment transaction). Operating the channels as described in FIG. 4 beneficially does not restrict payment and added value data flows to the speed limitations of the NFC contactless interface, and instead can leverage the higher data rates of BLE.

Initially, a user may check-in by touching the user device 102 to a POS terminal 104 (or other connected NFC reader or tag) upon entry to a merchant's store. The POS terminal 104 may communicate and bind with the user device 102. For example, the user device 102 may use an NFC channel to communicate the ID message 202 to the POS terminal 104. A user may then launch a payment app when ready to pay and the payment app may cause device 102 to send a ready to pay message 204 via an NFC channel. The user device 102 and the POS terminal 104 may subsequently use a BLE channel to communicate. For example, the user device 102 and POS terminal 104 may exchange data 206, such as VAS data, via the BLE channel. The user device 102 may also communicate a payment confirmation amount message 208 and a payment credential message 210 to the POS terminal 104 via a BLE channel. The POS terminal 104 may then form a payment transaction message including the payment credential and the total amount and communicate the payment transaction message to the payment processing network for approval. Whether approved or declined, the POS terminal 104 may communicate the summary message 212 including, for example, an indication whether the payment transaction was approved and a copy of the user's receipt identifying what items were purchased via a BLE channel.

FIG. 5 illustrates a table providing another channel configuration in accordance with example embodiments. An advantage of operating communication channels in this manner is that it permits the POS terminal 104 to intelligently select between NFC and BLE channels when communicating different messages.

With reference to FIG. 5, a user may check-in by touching the user device 102 to a POS terminal 104 (or NFC reader or NFC tag) upon entry to a merchant's store. The POS terminal 104 may communicate and bind with the user device 102. For example, the user device 102 may use an NFC channel to communicate the ID message 202 to the POS terminal 104. A user may subsequently launch a payment app when ready to pay and the payment app may cause device 102 to send a ready to pay message 204 via an NFC channel. The user device 102 and POS terminal 104 may exchange data 206, such as VAS data, via the NFC channel. The POS terminal 104 may select between NFC and BLE channels for the remaining messages. For example, in the first row of the table in FIG. 5, each of the confirmation message 208, the payment credential message 210, and the summary message 212 is communicated using a BLE channel. In the second row, the payment credential message 210 is communicated using the NFC channel and the confirmation message 208 and the summary message 212 are communicated using the BLE channel. In the third row, the confirmation message 208 and the payment credential message 210 are communicated using the NFC channel and the summary message is communicated using the BLE channel. Advantageously, the POS terminal 104 can select which of the NFC and BLE channels to use based on current needs or the particular transaction, or based on other environmental or transaction-based factors.

FIG. 6 illustrates a table providing another channel configuration in accordance with example embodiments. This example advantageously enables the merchant to present and apply coupons/vouchers to the user's bill before the point of purchase, thereby providing enhanced value to customers, reducing friction at the checkout for the merchant, and saving the user and merchant time. Existing POS hardware setup and current payment consumer behavior then applies, with the merchant again reducing checkout friction by using BLE to provide post-payment information including providing a receipt to the user.

With reference to FIG. 6, the POS terminal 104 may recognize and pair with the user device 102 to establish communication over a BLE channel. Once paired the user device 102 may use the BLE channel to communicate the ID message 202 to a POS terminal 104. The POS terminal 104 may also communicate the data exchange message 206 and any loyalty/coupon data via the BLE channel. Subsequently, the user may touch user device 102 to the POS terminal 104 and continue with an NFC payment. The POS terminal 104 may then communicate and bind with the user device 102. A user may subsequently launch a payment app when ready to pay and the payment app may cause device 102 to send a ready to pay message 204 via an NFC channel. The user device 102 and POS terminal 104 may exchange data 206, such as VAS data, via the BLE channel. The user device 102 may send the confirmation message 208 and the payment credential 210 via the NFC channel. The POS terminal 104 may communicate the summary message 212 via the BLE channel.

In yet another aspect, a variety of protocols or communication channels may be used at the same time to communicate data such as to a point of sale (POS) system. As a simple example, a personal account number (PAN) may have 16 digits. The 16 digits of the PAN can be broken up into parts and transmitted to the POS in an intended order. For example, the first four digits and digits 9-12 may be communicated via Wi-Fi to the POS system and digits 5-8 and 13-16 may be communicated via BLE to the backend of the POS system. At the backend of the POS system, the digits may be reconfigured in the proper order and communicated for authentication purposes. Thus, if someone attempts to intercept Wi-Fi communications, they will only receive an unusable section of the PAN (digits 1-4 and 9-12). Similarly, if someone attempts to hack into BLE communications, they will only receive an unusable portion of a PAN (digits 5-8 and 13-16). Logically, the use of a variety of communication channels may be used throughout the transaction process, such as receiving and communicating authorization signals. As a result, security of communications may be improved by using multiple channels of communication. Of course, the types and order of data transmissions shown and described herein are merely examples illustrating possible embodiments of the disclosed system and methods. It is also contemplated herein that additional or alternative data transmissions between the POS terminal 104, the user device 102, and the payment processing network 106 are also possible. For example, Wi-Fi or radio frequency identification (RFID), or other wireless forms of electronic communication between the user device 102 and the POS terminal 104 can be used in certain embodiments as alternative or additional communication channels.

Thus, the example embodiments advantageously provide for communication between a user's device and a merchant's POS terminal using two or more communication channels. Using multiple channels may enhance the user's experience and improve the speed at which a payment transaction can be completed.

Figure 7:
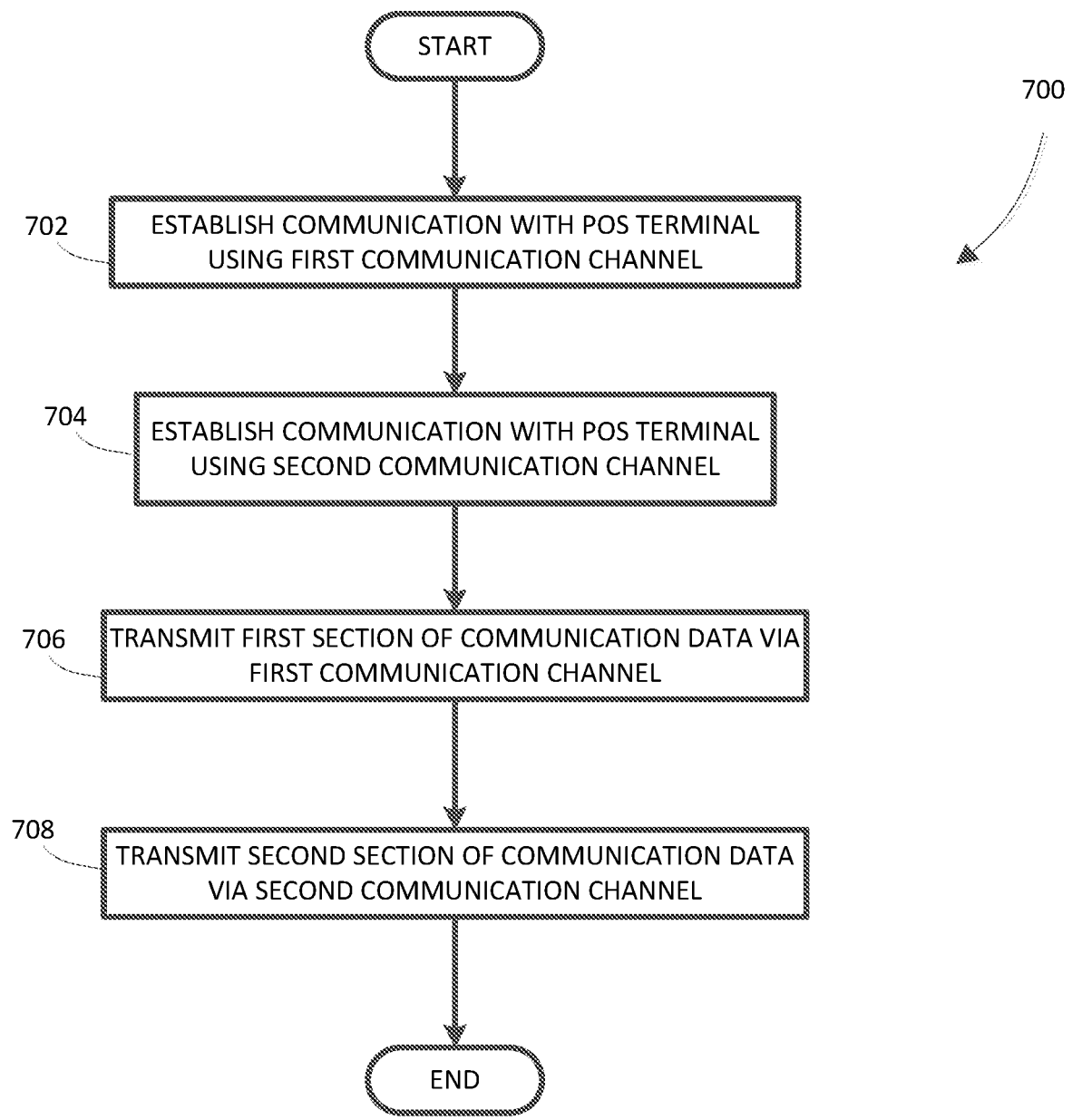
FIG. 7 illustrates a flow diagram of a method of multi-protocol data transfer in accordance with example embodiments.

FIG. 7 illustrates a flow chart of a method 700 of communicating with a POS terminal in accordance with example embodiments. The flow diagram may be implemented by a system or apparatus, such as, for example, user device 102. Each of the blocks shown in the flow diagram may be repeated one or more times, one or more of the blocks may be modified, and one or more of the blocks may be omitted. The method may be stored on a non-transitory computer readable medium as computer executable instructions. The computer executable instructions, when executed by at least one processor, may cause at least one computer or other device to perform the blocks as steps of a method one or more times. The flow diagram may begin at block 702.

In block 702, the method may include establishing wireless communication with a POS terminal using a first communication channel with a first communication form. In an example, a user device 102 may establish communication with a POS terminal 104 using an NFC channel.

In block 704, the method may include establishing wireless communication with the POS terminal USING a second communication channel and, in some embodiments, with a second communication form. In an example, a user device 102 may establish communication with a POS terminal 104 using a BLE channel.

In block 706, the method may include transmitting or otherwise communicating a first section of communication data via the first communication channel. In an example, a user device 102 may communicate an ID message 202 using the NFC channel.

In block 708, the method may include transmitting or otherwise communicating a second section of the communication data via the second communication channel. In an example, a user device 102 may communicate messages 204-212 using the BLE channel.

The method may end, may return to any of the preceding steps, and/or repeat one or more times.

Figure 8:
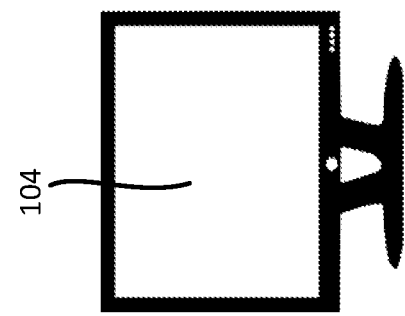
FIG. 8 illustrates elements of a sample computing system in accordance with example embodiments.
Figure 8:
Figure 8:
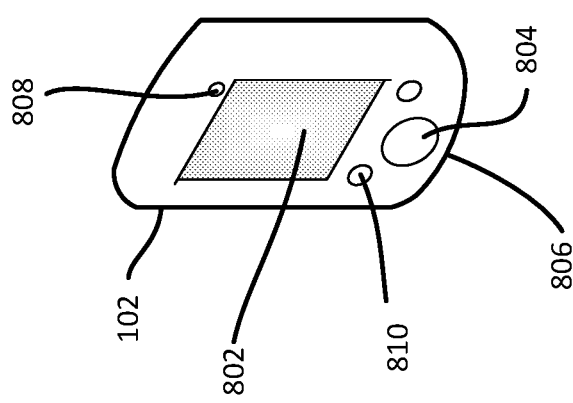

FIG. 8 may be a high level illustration of some of the elements a sample computing environment that may be physically configured to implement the various embodiments of the method and its logical variants. A user device 102 in the computing environment may store a software payment application that may be accessed in a variety of ways. In addition, the payment app may be obtained in a variety of ways such as from an app store, from a web site, from a store Wi-Fi system, etc. There may be various versions of the application to take advantage of the benefits of different computing devices, different languages and different API platforms.

The user device 102 may have a display 802 which may or may not be a touch sensitive display. More specifically, the display 802 may have a capacitance sensor, for example, that may be used to provide input data to the user device 102. In other embodiments, an input pad 804 such as arrows, scroll wheels, keyboards, etc., may be used to provide inputs to the user device 102. In addition, the user device 102 may have a microphone 806 which may accept and store verbal data, a camera 808 to accept images and a speaker 810 to communicate sounds.

Figure 9:
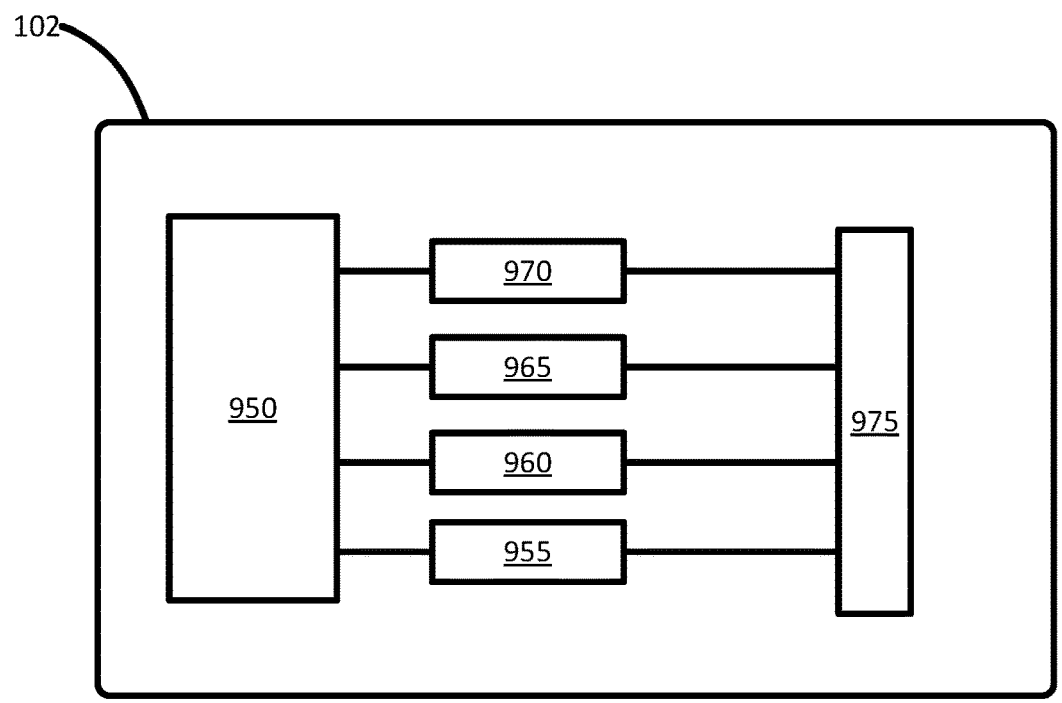
FIG. 9 illustrates a user device in accordance with example embodiments.

The user device 102 may be able to communicate in a variety of ways. In some embodiments, the communication may be wired such as through an Ethernet cable, a USB cable or RJ6 cable. In other embodiments, the communication may be wireless such as through Wi-Fi (802.11 standard), Bluetooth, cellular communication or near field communication devices. The communication may be direct to the POS terminal 104 or through a wireless network, e.g., Bluetooth, etc. FIG. 9 may be a simplified illustration of the physical elements that make up a user device 102 and FIG. 10 may be a simplified illustration of the physical elements that make up the POS terminal 104.

FIG. 9 may be a sample user device 102 that is physically configured according to be part of the system. The user device 102 may have a processor 950 that is physically configured according to computer executable instructions. It may have a portable power supply 955 such as a battery which may be rechargeable. It may also have a sound and video module 960 which assists in displaying video and sound and may turn off when not in use to conserve power and battery life. The user device 102 may also have volatile memory 965 and non-volatile memory 970. There also may be an input/output bus 975 that shuttles data to and from the various user input devices such as the microphone 906, the camera 908 and other inputs 902, etc. It also may control communicating with the networks, either through wireless or wired devices. Of course, this is just one embodiment of the portable computing device 102 and the number and types of portable computing devices 102 is limited only by the imagination.

Figure 10:
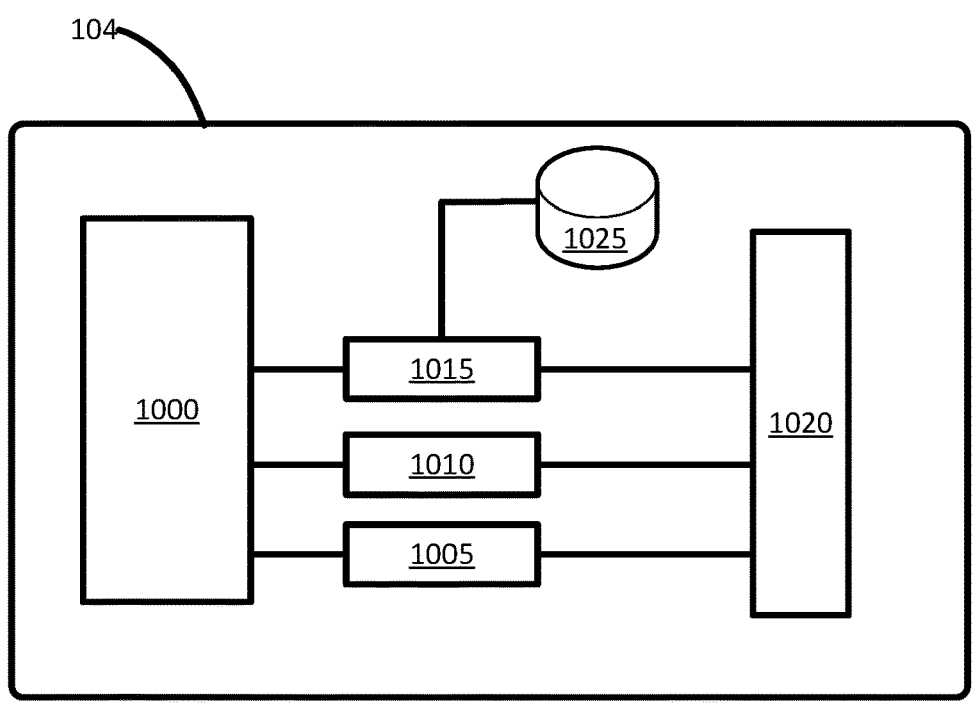
FIG. 10 illustrates a point of sale terminal in accordance with example embodiments.

An example of the physical elements that make up the POS terminal 104 may be further illustrated in FIG. 10. Some of the physical elements may be located in other devices, depending on processing needs. The POS terminal 104 may have a processor 1000 that is physically configured according to computer executable instructions. It may also have a sound and video module 1005 which assists in displaying video and sound and may turn off when not in use to conserve power and battery life. The POS terminal 104 may also have volatile memory 1010 and non-volatile memory 1015.

In some examples, the POS terminal 104 may include a digital storage such as a magnetic disk, an optical disk, flash storage, non-volatile storage, etc. Structured data may be stored in the digital storage such as in a database. A database 1025 may be stored in the memory 1010 or 1015 or may be separate. The database 1025 may also be part of a cloud and may be stored in a distributed manner. There also may be an input/output bus 1020 that shuttles data to and from the various user input devices such as microphones, the cameras, and inputs, etc. The input/output bus 1020 also may control of communicating with the networks, either through wireless or wired devices. Of course, this is just one embodiment of the POS terminal 104 and the number and types of user devices 102 and POS terminals is limited only by the imagination.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

The user devices, point of sale terminals, computers and servers described herein may be general purpose computers that may have, among other elements, a microprocessor (such as from the Intel Corporation, AMD or Motorola); volatile and non-volatile memory; one or more mass storage devices (i.e., a hard drive); various user input devices, such as a mouse, a keyboard, or a microphone; and a video display system. The user devices, point of sale terminals, computers and servers described herein may be running on any one of many operating systems including, but not limited to WINDOWS, UNIX, LINUX, MAC OS, or Windows (XP, VISTA, etc.). It is contemplated, however, that any suitable operating system may be used for the present invention. The servers may be a cluster of web servers, which may each be LINUX based and supported by a load balancer that decides which of the cluster of web servers should process a request based upon the current request-load of the available server(s).

The user devices, point of sale terminals, computers and servers described herein may communicate via networks, including the Internet, WAN, LAN, Wi-Fi, other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner. The interconnections between computers and servers in system are examples. Any device described herein may communicate with any other device via one or more networks.

The example embodiments may include additional devices and networks beyond those shown. Further, the functionality described as being performed by one device may be distributed and performed by two or more devices. Multiple devices may also be combined into a single device, which may perform the functionality of the combined devices.

The various participants and elements described herein may operate one or more computer apparatuses to facilitate the functions described herein. Any of the elements in the above-described Figures, including any servers, point of sale terminals, user devices, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++, or Perl using, for example, conventional or object-oriented techniques.

The software code may be stored as a series of instructions or commands on a non-transitory computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus and may be present on or within different computational apparatuses within a system or network.

It may be understood that the present invention as described above can be implemented in the form of control logic using computer software in a modular or integrated manner. Based on the disclosure and teachings provided herein, a person of ordinary skill in the art may know and appreciate other ways and/or methods to implement the present invention using hardware, software, or a combination of hardware and software.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention. A recitation of "a", "an" or "the" is intended to mean "one or more" unless specifically indicated to the contrary. Recitation of "and/or" is intended to represent the most inclusive sense of the term unless specifically indicated to the contrary.

One or more of the elements of the present system may be claimed as means for accomplishing a particular function. Where such means-plus-function elements are used to describe certain elements of a claimed system it will be understood by those of ordinary skill in the art having the present specification, figures and claims before them, that the corresponding structure is a general purpose computer, processor, or microprocessor (as the case may be) programmed to perform the particularly recited function using functionality found in any general purpose computer without special programming and/or by implementing one or more algorithms to achieve the recited functionality. As would be understood by those of ordinary skill in the art that algorithm may be expressed within this disclosure as a mathematical formula, a flow chart, a narrative, and/or in any other manner that provides sufficient structure for those of ordinary skill in the art to implement the recited process and its equivalents.

While the present disclosure may be embodied in many different forms, the drawings and discussion are presented with the understanding that the present disclosure is an exemplification of the principles of one or more inventions and is not intended to limit any one of the inventions to the embodiments illustrated.

The present disclosure provides a solution to the long-felt need described above. In particular, the systems and methods described herein may be configured for improving data transfer. Further advantages and modifications of the above described system and method will readily occur to those skilled in the art. The disclosure, in its broader aspects, is therefore not limited to the specific details, representative system and methods, and illustrative examples shown and described above. Various modifications and variations can be made to the above specification without departing from the scope or spirit of the present disclosure, and it is intended that the present disclosure covers all such modifications and variations provided they come within the scope of the following claims and their equivalents.

The invention claimed is:

1. A computer-implemented method comprising:
   establishing wireless communication between a user computing device and an electronic point of sale terminal using a first communication channel, the first communication channel being one of a Bluetooth low energy (BLE) channel, a Wi-Fi (802.11 standard) channel, and a radio frequency identification channel;
   establishing communication between the user computing device and the electronic point of sale terminal using a near field communication (NFC) channel;
   communicating an identification message from the user computing device to the electronic point of sale terminal via the NFC channel, the identification message including a unique identifier for the user device and an indication of communication channels that the user computing device is configured to use;
   communicating contents of a virtual shopping cart from the user computing device to the electronic point of sale terminal via the first communication channel, the contents of the virtual shopping cart at least including purchase item identifiers and a purchase amount for items to be purchased;
   communicating a payment confirmation amount message from the user computing device to the electronic point of sale terminal via the first communication channel, the payment confirmation amount message confirming that the electronic point of sale terminal is permitted to charge the purchase amount for the items to be purchased in the virtual shopping cart; and
   communicating a payment credential message from the user computing device to the electronic point of sale terminal via the first communication channel, the payment credential message including a payment credential associated with a payment account to be used for the purchase transaction.

2. The method of claim 1 further comprising communicating merchant value added service data from the point of sale terminal to the user computing device via the first communication channel.

3. The method of claim 1, further comprising communicating a ready to pay message from the user device to the point of sale terminal via the first communication channel upon launching a payment application at the user computing device.

4. The method of claim 1, further comprising communicating a summary message from the point of sale terminal to the user computing device via the first communication channel, the summary message including a sales receipt identifying the items purchased and an indication of whether the purchase transaction was approved.

5. The method of claim 1, wherein the first communication channel and the second communication channel are each at least one of near field communication, Bluetooth low energy, Wi-Fi (802.11 standard), or radio frequency identification.

6. A computer system comprising:
   a user computing device;
   an electronic point of sale terminal;
   the user computing device being physically configured according to computer executable instructions for:
   establishing wireless communication between the user computing device and the electronic point of sale terminal using a first communication channel, the first communication channel being one of a Bluetooth low energy (BLE) channel, a Wi-Fi (802.11 standard) channel, and a radio frequency identification channel;
   establishing communication between the user computing device and the electronic point of sale terminal using a near field communication (NFC) channel;
   communicating an identification message from the user computing device to the electronic point of sale terminal via the NFC channel, the identification message including a unique identifier for the user device and an indication of communication channels that the user computing device is configured to use;
   communicating contents of a virtual shopping cart from the user computing device to the electronic point of sale terminal via the first communication channel, the contents of the virtual shopping cart at least including purchase item identifiers and a purchase amount for items to be purchased;

communicating a payment confirmation amount message from the user device to the point of sale terminal via the first communication channel, the payment confirmation amount message confirming that the point of sale terminal is permitted to charge the purchase amount for the items to be purchased in the virtual shopping cart; and communicating a payment credential message from the user computing device to the point of sale terminal via the first communication channel, the payment credential *message including a payment credential associated with a payment account to be used for the purchase transaction.

7. The computer system of claim 6,
wherein the user computing device is also configured according to computer executable instructions for communicating merchant value added service data from the point of sale terminal to the user computing device via the first communication channel.

8. The user computing device of claim 6, wherein the user computing device is also configured according to computer executable instructions for communicating a ready to pay message from the user device to the point of sale terminal via the first communication channel upon launching a payment application at the user computing device.

9. The user computing device of claim 6, wherein the user computing device is also configured according to computer executable instructions for communicating a summary message from the point of sale terminal to the user computing device via the first communication channel, the summary message including a sales receipt identifying the items purchased and an indication of whether the purchase transaction was approved.

10. A computer system comprising:
a user computing device;
an electronic point of sale terminal;
the electronic point of sale terminal being physically configured according to computer executable instructions for:
establishing wireless communication with a user computing device using a first communication channel;
establishing wireless communication with the user computing device using a near field communication (NFC) channel;
transmitting a first type of communication data to the user computing device via the first communication channel;
transmitting a second type of communication data to the user computing device via the NFC channel;
receiving a third type of communication data from the user computing device via at least one of the first communication channel or the NFC channel, the third type of communication data being contents of a virtual shopping cart, the contents of the virtual shopping cart at least including purchase item identifiers and a purchase amount for items to be purchased; and
receiving a payment credential message from the user computing device via the first communication channel, the payment credential message including a payment credential associated with a payment account to be used to purchase the contents of the virtual shopping cart;
wherein the first communication channel is one of a Bluetooth low energy, a Wi-Fi (802.11 standard) channel, and a radio frequency identification channel.

11. The computer system of claim 10, wherein the first type of communication data is an identification message and the second type of communication data is at least one of a payment credential, a purchase price, an purchase item identifier, or a confirmation message.

12. The computer system of claim 10, further comprising establishing wireless communication with the point of sale terminal using a third communication channel, and transmitting a fourth type of communication data to the point of sale terminal via the third communication channel.

* * * * *